July 7, 1942. B. BANNISTER ET AL 2,289,167

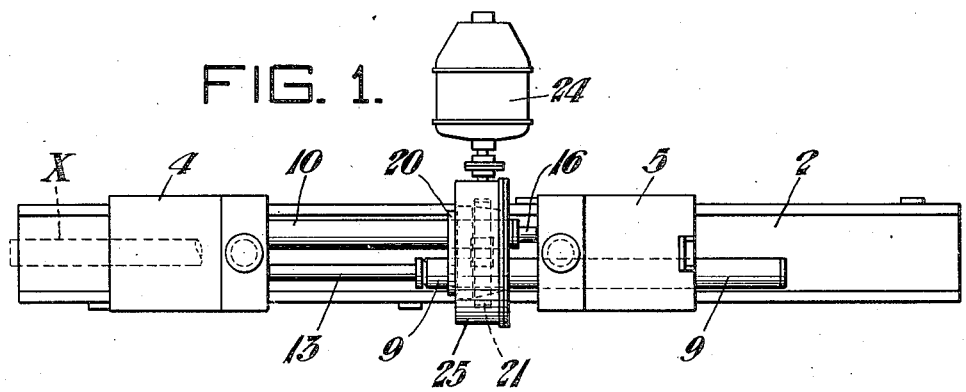
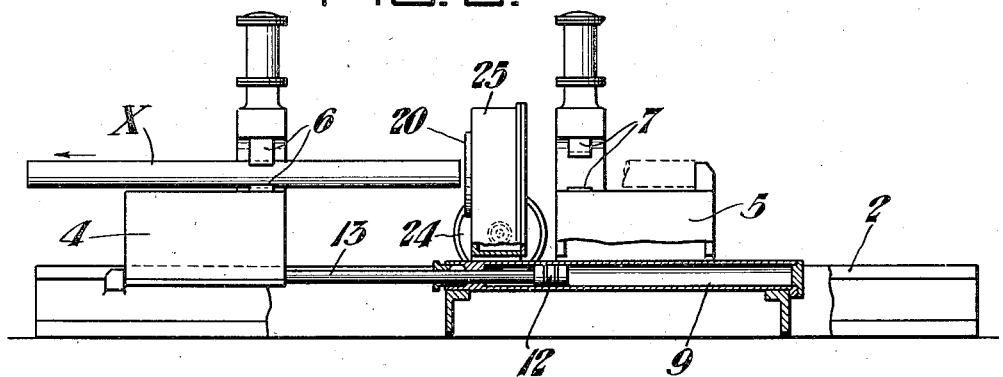
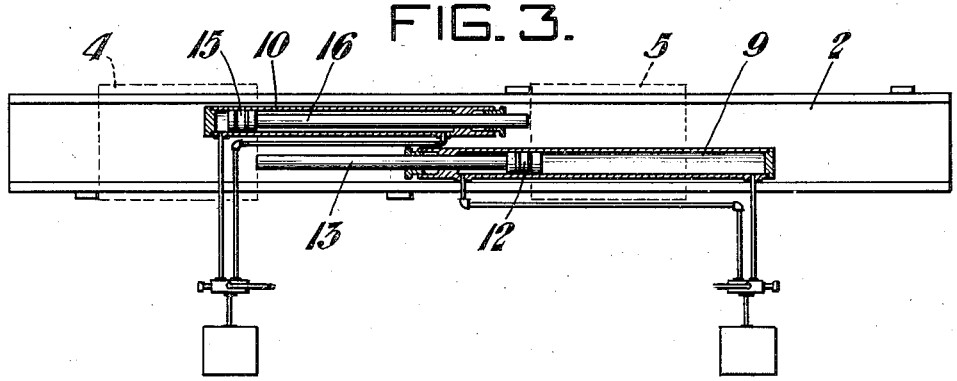

CUTTING TOOL

Filed Dec. 15, 1939 2 Sheets-Sheet 2

Inventors:
BRYANT BANNISTER and
GEORGE C. GREENWOOD,
by: John E. Jackson
their Attorney.

Patented July 7, 1942

2,289,167

UNITED STATES PATENT OFFICE 2,289,167

CUTTING TOOL

Bryant Bannister, Mount Lebanon, and George C. Greenwood, Lorain, Ohio, assignors to National Tube Company, a corporation of New Jersey Application December 15, 1939, Serial No. 309,450

1 Claim. (Cl. 29—103)

This invention relates to cutting tools, and more particularly to those which embody a rotatable cutting disk.

In cutting a rotating workpiece with a rotatable cutting disk the latter is rotated because of pressure against it and the direction of travel of the workpiece relative to it. Because of this, the mid-portion of the periphery of the rotatable cutting disk must overlap the uncut portion of the rotating workpiece. In practice it has been found that after the largest diametral portion of the rotatable cutting disk (which forms the cutting edge) has become slightly worn, the front face may contact the uncut portion of the rotating workpiece and prevent proper cutting. By reducing the angularity of the plane of the rotatable cutting disk with respect to the axis of the rotating workpiece, this interference is eliminated and proper cutting action takes place without the necessity of resharpening the cutting edge. This operation may be repeated several times, which results in greatly extending the length of time between resharpening operations, and therefore enhances the life of service of the rotary cutting disk.

In our copending application, Serial No. 296,146, filed September 22, 1939, now Patent Number 2,233,724, issued March 4, 1941 and entitled "Cutting tool," we have disclosed and claimed a combination of instrumentalities which seek to overcome the shortcomings of the devices of the prior art. According to this copending application, there is provided a single rotary cutting disk which is antifrictionally mounted and angularly adjustable with respect to the axis of the rotating workpiece. The device of the present invention embodies certain of the features of said copending application, but seeks further to provide a plurality of cutting instrumentalities which are constructed and arranged for planetary movement about the axis of the workpiece.

It is among the objects of the present invention to obtain a more rapid and cleaner cut than those heretofore effected.

Another object is to obtain a rapid and clean cut with a minimum expenditure of power.

Still another object is the provision of a device which will accomplish the foregoing objects and one which is, at the same time, inexpensive to manufacture and maintain.

The foregoing and other objects will be apparent after referring to the drawings, in which:

Figure 1 is a plan of the apparatus of the invention;

Figure 2 is a side elevation, partly in section;

Figure 3 is a sectional plan;

Figure 4:
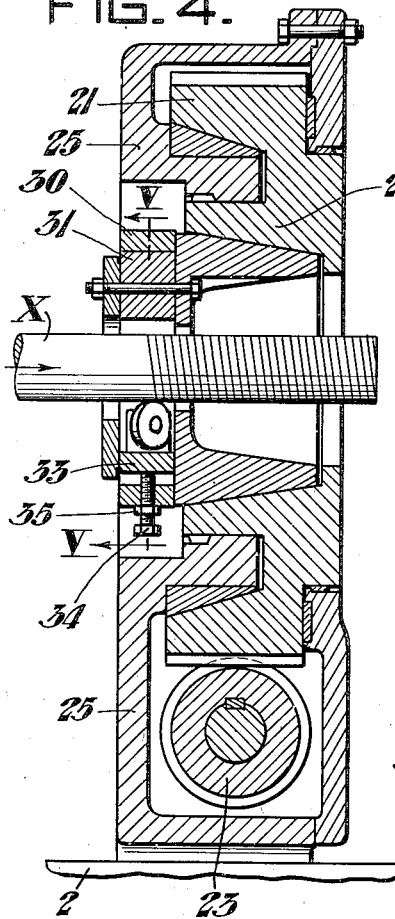
Figure 4 is an enlarged sectional elevation of the rotary head of the present invention.

Referring more particularly to the drawings, the numeral 2 generally designates a machine capable of supporting a workpiece, or billet, to be peeled or cut, the latter being indicated at X.

More specifically, the machine generally designated at 2 comprises a pair of opposed and aligned reciprocable carriages 4 and 5, each of which is provided with conventional gripping jaws, as at 6 and 7, respectively.

The bed of the machine 2 carries a pair of opposed, although not aligned, fluid cylinders, as shown at 9 and 10. The fluid cylinder 9 contains a piston 12 and piston rod 13, the latter of which is connected to the reciprocable carriage 4; while the fluid cylinder 10 contains a piston 15 and piston rod 16 which is connected to the reciprocable carriage 5.

Fluid is forced into, and withdrawn from, both ends of the fluid cylinders 9 and 10 in any convenient manner (as shown); whereby the reciprocable carriages 4 and 5 may be moved toward and away from each other, and corresponding movement may be imparted to the workpiece, or billet, X when the respective gripping jaws 6 and 7 are operated.

Disposed circumferentially of the workpiece or billet X is a rotary head 20 having a peripheral worm gear 21, the latter being rotated by a worm 23 driven from an adjacent motor 24. The rotary head 20 is not reciprocable in the manner of the carriages 4 and 5. The worm gear 21 is enclosed in a housing 25 of suitable design.

Carried by the rotary head 20 is an annular ring 30 provided with a plurality of interiorly disposed wedge shaped blocks 31 providing therebetween radial apertures 32.

Within each of the radial apertures 32 there is mounted a reciprocable plug 33, the latter being adjustable axially toward and away from the workpiece X by means of adjusting screws 34 which are threaded through the annular ring 30 and provided exteriorly thereof with the usual lock nuts 35.

Figure 5:
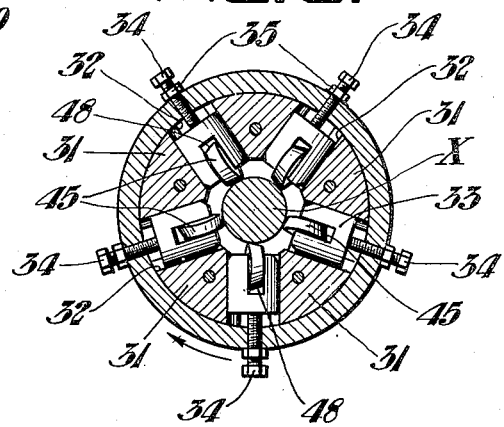
Figure 5 is a sectional view on the line V—V of Figure 4.

Referring more particularly to Figure 5 of the drawings, each of the reciprocable plugs 33 is bifurcated on its inner end, as shown at 36, thereby providing a recess 37 between the arms thereof.

Between the arms provided by the bifurcated end 36 of each of the reciprocable plugs 33 there extends a pin 39 providing an intermediate shaft 40 around which there is a pair of conventional spaced apart ball bearings 41.

Figure 6:
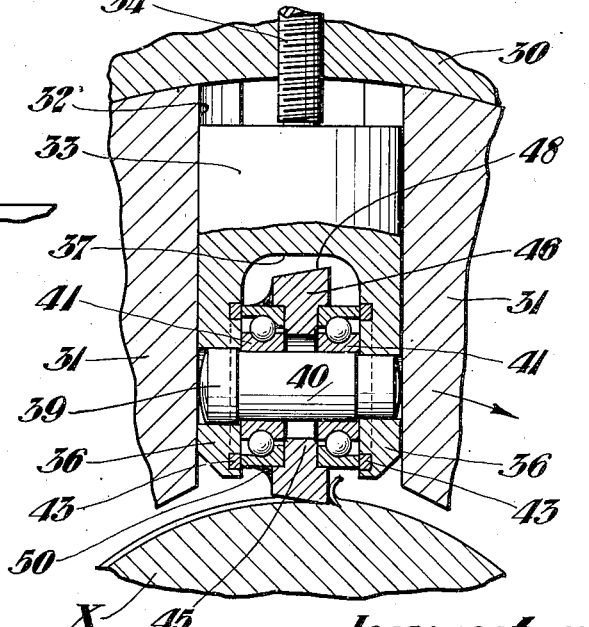
Figure 6 is an enlarged fragmentary sectional elevation of a detail.

As shown in Figure 6, the outer face of the outer race of each of the ball bearings 41 contacts a wearing ring 43 which is carried in a recess in the adjacent arm formed by the bifurcated ends 36 of the reciprocable plug 33.

Disposed between the inner faces of the outer races of the ball bearings 41 is an annular ring 45 having an enlarged portion 46 which extends exteriorly of, and slightly over, the outer peripheries of the outer races of the ball bearings 41. The outer face or periphery of the enlarged portion 46 of each of the annular rings 45 is frusto-conical in shape, as designated at 48.

Referring more particularly to Figure 6, it will be observed that the enlarged portions 46 of the annular ring-like members 45 are welded at the outer face of their smallest diametral portions to the periphery of the outer race of the adjacent ball bearing 41, as shown at 50.

As will be noted from an inspection of Figure 5, the largest surface of the frusto-conical portions 48 on the enlarged portions 46 of the annular rings 45 is inclined helically with respect to the axis of the workpiece X, in the same direction, and at substantially the same angularity.

From the foregoing it will be seen that the frusto-conical periphery 48 of the enlarged portions 46 of the annular ring-like members 45 between the ball bearings 41 function as rotary cutters and peel or cut the workpiece or billet X in the desired manner.

In operation:

The workpiece or billet X is gripped by the gripping jaws 7 of the reciprocable carriage 5 and fluid slowly withdrawn from the fluid cylinder 10 in back of the piston 15. Thus, the workpiece or billet X is drawn from right to left by the rotary head 20, wherein it is operated upon by the frusto-conical peripheries 48 of the rotary cutting disks, and cut or peeled to the desired extent. When about half way through the rotary head, the gripping jaws 6 of the reciprocable carriage 4 are made to grip the leading end of the already peeled or cut portion of the workpiece or billet X and fluid slowly withdrawn from the fluid cylinder 9 in back of the piston 12. In this manner the reciprocable carriage 4 is made to control the movement of the workpiece or billet for the remainder of its travel through the rotary head. During the operation of one set of gripping jaws (6 or 7), the other set is rendered inoperative, and when fluid is forced into one end of one of the fluid cylinders (4 or 5), it is withdrawn from the other end thereof. The frusto-conical rotary cutting disks 48 have a tendency to pull the workpiece or billet X through the rotary head 20; and the gripping jaws (6 or 7) are utilized to resist this tendency.

From an inspection of Figure 5 of the drawings, it will be apparent that the chip engaging the upper face of each of the rotary cutting disks causes them to rotate; and the action obtained thereby may be likened to a slicing action instead of the usual tearing action imparted by conventional devices.

Since any one portion of the cutting edge is in contact with the work for only a small percentage of the time and is exposed to the cooling effect of the atmosphere and a suitable coolant, it is feasible to operate at speeds several times as great as is customarily employed for the cutting or peeling operation.

By regulation of fluid feed, the speed of travel of the billet through the rotary head is restricted to the desired rate. As soon as the forward end of the workpiece or billet has progressed through the rotary head it is gripped by the gripping jaws on the other reciprocable carriage and its forward movement controlled in the above manner. The gripping jaws on the first reciprocable carriage is then released and this carriage is returned to its initial position to receive another billet and feed the same into the rotary head as soon as the other has traveled therethrough.

Suitable instrumentalities are provided to automatically control the movement of the reciprocable carriages 4 and 5. Such controls may take any one of a number of conventional forms of control media, and form no part of the present invention and are, accordingly, not shown.

While we have shown and described one specific embodiment of the present invention, it will be seen that we do not wish to be limited exactly thereto, since various modifications may be made without departing from the scope of the invention, as defined by the following claim.

We claim:

A cutting device for workpieces of substantially circular cross section, comprising means for supporting the workpiece and axially moving the same, means for holding the workpiece against rotation, a plurality of radially arranged cutting disks disposed about the workpiece with their edges in contact therewith, means for planetarily moving said cutting disks about the workpiece, the edge of each of said cutting disks being inclined at an acute angle to the axis of the workpiece to thereby obtain a broad and relatively shallow cut, the angle of inclination of the edge of each of the said cutting disks being sufficient to cause it to rotate and tend to impart axial movement to the workpiece, and means for regulating the longitudinal movement of the workpiece to such a speed as will permit the entire surface thereof to be removed by said cutting disks.

BRYANT BANNISTER.
GEORGE C. GREENWOOD.